United States Patent
Chun (10) Patent No.: US 9,406,923 B2
(45) Date of Patent: *Aug. 2, 2016

(54) SECONDARY BATTERY AND METHOD OF MANUFACTURING THE SAME

(75) Inventor: Kwan-Sic Chun, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 472 days.

This patent is subject to a terminal disclaimer.

(21) Appl. No.: 12/844,681

(22) Filed: Jul. 27, 2010

(65) Prior Publication Data

US 2011/0117390 A1    May 19, 2011

(30) Foreign Application Priority Data

Nov. 16, 2009 (KR) .................. 10-2009-0110363
Nov. 16, 2009 (KR) .................. 10-2009-0110364

(51) Int. Cl.
*H01M 2/34* (2006.01)
*H01M 10/04* (2006.01)
*H01M 2/04* (2006.01)

(52) U.S. Cl.
CPC ............. *H01M 2/34* (2013.01); *H01M 2/348* (2013.01); *H01M 10/0422* (2013.01); *H01M 2/04* (2013.01); *Y10T 29/53135* (2015.01)

(58) Field of Classification Search
CPC ......... H01M 2/34; H01M 2/348; H01M 2/04; H01M 2/0434; H01M 10/0422; Y10T 29/53135
USPC ...................... 429/62, 149, 163, 7, 61, 153
See application file for complete search history.

(56) References Cited

U.S. PATENT DOCUMENTS

| | | | |
|---|---|---|---|
| 4,006,443 A | 2/1977 | Kouchich et al. | |
| 5,212,466 A | 5/1993 | Yamada et al. | |
| 5,703,463 A | 12/1997 | Smith | |
| 5,939,968 A | 8/1999 | Nguyen et al. | |
| 6,114,942 A * | 9/2000 | Kitamoto et al. | 338/22 R |
| 6,356,051 B1 | 3/2002 | Hasunuma et al. | |

(Continued)

FOREIGN PATENT DOCUMENTS

CN   2 899 126      5/2007
CN   101188279 A    5/2008

(Continued)

OTHER PUBLICATIONS

Extended European Search Report dated Sep. 6, 2011 for corresponding EP Application No. 10190230.2.

(Continued)

*Primary Examiner* — Jonathan Jelsma
*Assistant Examiner* — Omar Kekia
(74) *Attorney, Agent, or Firm* — Knobbe Martens Olson & Bear LLP (57) ABSTRACT

In order to allow a standardized high-capacity cell to selectively have high-output or high-capacity characteristics, a secondary battery includes a can for accommodating an electrode assembly and an electrolyte; a cap assembly mounted on the can; first metal foil attached on a top surface of the cap assembly or a bottom surface of the can; a circuit protection element attached on the first metal foil; and second metal foil attached on the circuit protection element, wherein a size and a shape of the second metal foil is determined such that a portion of the second metal foil does not overlap the circuit protection element.

20 Claims, 10 Drawing Sheets

(56) References Cited

U.S. PATENT DOCUMENTS

| | | |
|---|---|---|
| 6,617,069 B1 | 9/2003 | Hopper et al. |
| 6,794,980 B2 | 9/2004 | Chu et al. |
| 7,352,272 B2 | 4/2008 | Wang et al. |
| 7,474,076 B2 | 1/2009 | Kim |
| 7,609,142 B2 | 10/2009 | Koyama et al. |
| 2005/0026033 A1 | 2/2005 | Kawano et al. |
| 2007/0090809 A1 | 4/2007 | Miyasaka |
| 2008/0118820 A1* | 5/2008 | Jang et al. ............ 429/62 |
| 2008/0254358 A1 | 10/2008 | Takase et al. |
| 2008/0254359 A1 | 10/2008 | Byun et al. |
| 2009/0081539 A1 | 3/2009 | Koh et al. |
| 2009/0123831 A1 | 5/2009 | Kim |
| 2009/0297941 A1 | 12/2009 | Shen et al. |
| 2010/0015522 A1 | 1/2010 | Hasunuma et al. |
| 2010/0086833 A1 | 4/2010 | Pozin et al. |
| 2010/0279170 A1 | 11/2010 | Lee et al. |
| 2011/0117390 A1 | 5/2011 | Chun |
| 2011/0117400 A1 | 5/2011 | Chun |

FOREIGN PATENT DOCUMENTS

| | | |
|---|---|---|
| EP | 2 058 875 A2 | 5/2009 |
| JP | 03-87001 | 4/1991 |
| JP | H06 38157 U | 5/1994 |
| JP | 1995-065856 | 3/1995 |
| JP | 1995-041974 U | 7/1995 |
| JP | 2000-513149 | 10/2000 |
| JP | 2000-340192 A | 12/2000 |
| JP | 2000340192 | 12/2000 |
| JP | 2007-184138 | 7/2007 |
| JP | 2008-71828 | 3/2008 |
| JP | 2008-091505 | 4/2008 |
| JP | 2011-108630 | 6/2011 |
| KR | 10-2007-0076170 A | 7/2007 |
| KR | 10-2007-0081306 | 8/2007 |
| KR | 10-2009-0055699 | 6/2009 |
| WO | WO97/49102 | 12/1997 |

OTHER PUBLICATIONS

Extended European Search Report dated Sep. 6, 2011 for priority EP Application No. 10190234.4.
Office Action dated Mar. 23, 2011 for corresponding KR Application No. 10-2009-0110363, to which this application claims priority.
Office Action dated Mar. 25, 2011 for corresponding KR Application No. 10-2009-0110364, to which this application claims priority.
U.S. Appl. No. 12/844,676, filed Jul. 27, 2010, Kwan-Sic Chun.
Office Action dated Oct. 30, 2012 for corresponding JP Application 2010-173709.
Office Action dated Jan. 29, 2013 for corresponding JP Application No. 2010-141573.
Office Action dated May 28, 2013 for corresponding U.S. Appl. No. 12/844,676.
Chinese Office Action dated Dec. 27, 2013 for Chinese Patent Application No. CN 2010105516723 which shares priority of Korean Patent Application No. KR 10-2009-0110364 with captioned U.S. Appl. No. 12/844,681.
Chinese Office Action dated Jan. 13, 2014 for Chinese Patent Application No. CN 201010551684.6 which shares priority of Korean Patent Application No. KR 10-2009-0110364 with U.S. Appl. No. 12/844,676, which is related to captioned U.S. Appl. No. 12/844,681.
Office Action issued on Jul. 21, 2014 for Chinese Patent Application No. 201210024940.5.
Examination Report issued on May 20, 2016 for European Patent Application No. 10 190 234.4.

* cited by examiner

SECONDARY BATTERY AND METHOD OF MANUFACTURING THE SAME

RELATED APPLICATIONS

This application claims the benefit of Korean Patent Application Nos. 10-2009-0110363 filed on Nov. 16, 2009 and 10-2009-0110364, filed on Nov. 16, 2009, in the Korean Intellectual Property Office, the disclosure of which is incorporated herein in its entirety by reference. This application is also related to and incorporates herein by reference the entire content of the concurrently filed application: SAFETY ELEMENT ASSEMBLY (Ser. No. 12/844,676).

BACKGROUND

1. Field

One or more embodiments of the present invention relate to a secondary battery and a method of manufacturing the same, and more particularly, to a secondary battery on which a circuit protection element, such as a positive temperature coefficient (PTC) element, is attached, and a method of manufacturing the same.

2. Description of the Related Art

Secondary batteries are rechargeable and dischargeable batteries. Representative secondary batteries include a nickel-hydrogen battery, a lithium battery and a lithium ion battery. Secondary batteries are used in various products including portable electronic information devices such as mobile phones, notebook computers, electronic dictionaries, and electric devices such as electric bicycles, electric scooters and electric drills.

According to their shape, secondary batteries are divided into a cylindrical type, an oval type, a rectangular type, a square type and a pouch type.

In order to prevent damage and performance deterioration of a secondary battery due to overcharging and an overcurrent, the secondary battery may include a safety device such as a circuit protection module, a safety vent, a positive temperature coefficient (PTC) element, a thermal fuse, a separator, an additive or some combination thereof.

The PTC element increases its electrical resistance and thereby reduces current if a battery is heated above a certain temperature, thereby protecting the battery. Accordingly, the PTC element is not used in a battery that requires a high output in a harsh environment.

A high-capacity battery generally includes a PTC element for safety. Accordingly, a secondary battery including a PTC element may be appropriately used in products that are normally used in a mild environment and require safety rather than a high output, e.g., a notebook computer. On the other hand, a secondary battery not including a PTC element may be appropriately used in products that are normally used in a harsh environment and require a high output rather than safety, e.g., an electric bicycle, an electric scooter and an electric drill.

The resistance of a PTC element is determined according to the temperature of a battery and thus may be disposed at a position where the temperature is accurately sensed. Accordingly, it is more advantageous to include a PTC element in a battery as long as a space for the PTC element exists. A high-output/high-capacity secondary battery has a space for a PTC element and thus includes the PTC element inside.

In general, a high-capacity secondary battery for a notebook computer includes a PTC element inside while a medium-output or high-output secondary battery for a power tool, an electric bicycle, an electric scooter, a mower or a vacuum cleaner does not include a PTC element. As such, according to what the product that uses the secondary battery is, a high-capacity battery or a high-output battery has to be differently manufactured.

SUMMARY

One or more embodiments of the present invention include a secondary battery and a method of manufacturing the same, in order to commonly use a standardized secondary battery in products used in different environments.

Additional aspects will be set forth in part in the description which follows and, in part, will be apparent from the description, or may be learned by practice of the presented embodiments.

According to one or more embodiments of the present invention, a secondary battery includes a can for accommodating an electrode assembly and an electrolyte; a cap assembly mounted on the can; first metal foil attached on a top surface of the cap assembly or a bottom surface of the can; a circuit protection element attached on the first metal foil; and second metal foil attached on the circuit protection element, wherein a size and a shape of the second metal foil is determined such that a portion of the second metal foil does not overlap the circuit protection element.

The secondary battery may have a cylindrical shape. Alternatively, the secondary battery may have an oval shape or a square shape.

The can may be a cylindrical can, and the second metal foil may extend toward a center of the cylindrical can from an end of the circuit protection element. Alternatively, the second metal foil may extend toward a circumference of the cylindrical can from an end of the circuit protection element. However, in this case, the second metal foil may not protrude outside an outer circumference of the cylindrical can.

The circuit protection element may be a positive temperature coefficient (PTC) element or a thermal fuse.

The secondary battery may further include a supporting member disposed on a side of the circuit protection element, the supporting member being in surface-contact with at least a portion of the second metal foil. The supporting member may be an electrical insulator.

Sizes and shapes of the circuit protection element, the supporting member and the second metal foil may be determined such that at least a portion of one surface of the first metal foil is exposed.

For example, the first metal foil may have a circular shape, the circuit protection element may be a PTC element and may have at least a partial ring shape, the supporting member may have a shape corresponding to at least a portion of a hole formed in the at least partial ring shape of the circuit protection element, and the second metal foil may have a shape for covering the circuit protection element and the supporting member.

Alternatively, the first metal foil may have a ring shape, the circuit protection element may have a partially-cut ring shape corresponding to the ring shape of the first metal foil, the supporting member may have a shape corresponding to at least a portion of a hole formed in the partially-cut ring shape of the circuit protection element, and the second metal foil may have a partially-cut circular shape corresponding to the circuit protection element and the supporting member.

Alternatively, the first metal foil may have a circular shape, the circuit protection element may have a partially-cut circular shape corresponding to the circular shape of the first metal foil, the supporting member may have a two-side-cut circular shape, and the second metal foil may have a shape corresponding to a combination of the first metal foil and the supporting member.

The second metal foil may be welded to an external tab for electrical connection, and a portion of the second metal foil corresponding to the supporting member is welded to the external tab.

The secondary battery may have a capacity equal to or greater than 2,000 mAh or an output equal to or greater than 14,000 mA.

According to one or more embodiments of the present invention, a method of manufacturing a secondary battery includes preparing a can for accommodating an electrode assembly and an electrolyte, and a cap assembly mounted on the can; attaching a circuit protection assembly formed by stacking first metal foil, a circuit protection element and second metal foil, on a bottom surface of the can or a top surface of the cap assembly; and attaching an external tab to an extended portion of the second metal foil, the extended portion not corresponding to the circuit protection element, for electrical connection.

The secondary battery may have a cylindrical shape. Alternatively, the secondary battery may have an oval shape or a square shape.

The circuit protection assembly may further include a supporting member disposed on a side of the circuit protection element, the supporting member being in surface-contact with the second metal foil, and the extended portion of the second metal foil may overlap the supporting member. In other words, the supporting member may be a portion of the circuit protection assembly and may be permanently attached to the secondary battery.

Alternatively, the method may further include disposing a welding jig on a side of the circuit protection element so as to be in surface-contact with the first metal foil, and the attaching of the external tab may include welding the external tab to a portion of the second metal foil corresponding to the supporting member. In this case, the circuit protection assembly may not include an additional supporting member and the welding jig may function as the supporting member.

The supporting member and the welding jig may be electrical insulators.

The attaching of the circuit protection assembly may include welding a portion of the first metal foil not corresponding to the circuit protection element on the bottom surface of the can or the top surface of the cap assembly.

The circuit protection element may be a positive temperature coefficient (PTC) element or a thermal fuse.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1:
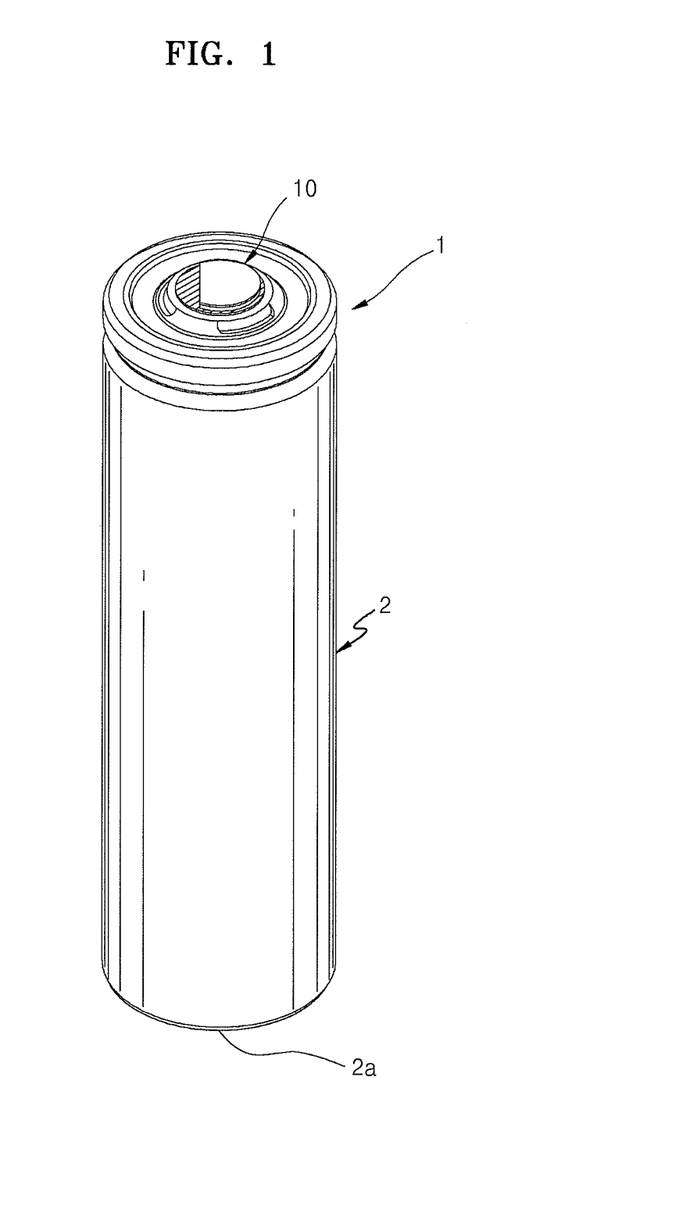
FIG. 1 is a perspective view of a secondary battery on which a circuit protection assembly is attached, according to an embodiment of the present invention.
Figure 2:
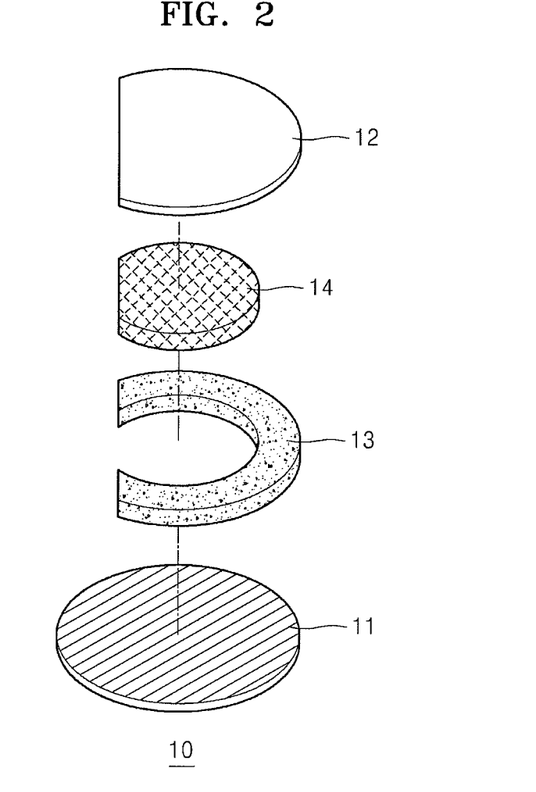
FIG. 2 is an exploded perspective view of the circuit protection assembly illustrated in FIG. 1.

FIG. 1 is a perspective view of a secondary battery on which a circuit protection assembly 10 is attached, according to an embodiment of the present invention. FIG. 2 is an exploded perspective view of the circuit protection assembly 10 illustrated in FIG. 1.

Referring to FIGS. 1 and 2, the secondary battery according to the current embodiment includes an electrode assembly (not shown), a cylindrical can 2, a cap assembly 1 and a circuit protection assembly 10. The cylindrical can 2 generally accommodates the electrode assembly, an electrolyte (not shown), an upper insulating plate (not shown) and a lower insulating plate (not shown). The electrode assembly is formed by winding a positive electrode, a separator and a negative electrode about a center pin. The electrolyte is filled in the electrode assembly. The upper and lower insulating plates are separately disposed on and under the electrode assembly and prevent a short circuit between the electrode assembly and the cylindrical can 2. Holes through which the electrolyte is injected and a gas is emitted may be formed in the upper insulating plate.

The cap assembly 1 is combined with the cylindrical can 2 on the cylindrical can 2 so as to seal the cylindrical can 2. The cap assembly 1 may include a safety vent, a current interrupt device and a cap-up.

Figure 3:
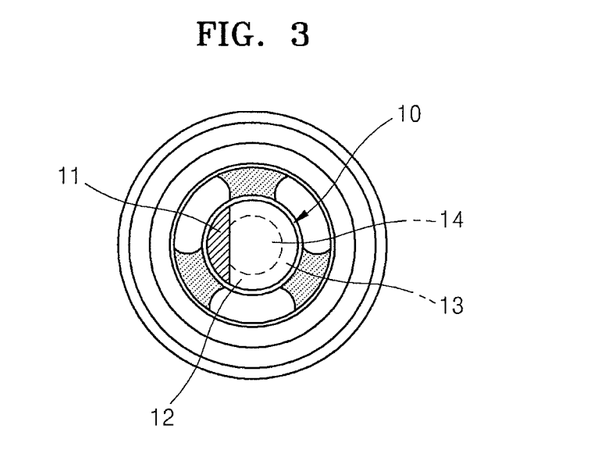
FIG. 3 is a top view of a secondary battery on which the circuit protection assembly illustrated in FIG. 2 is attached.
Figure 5:
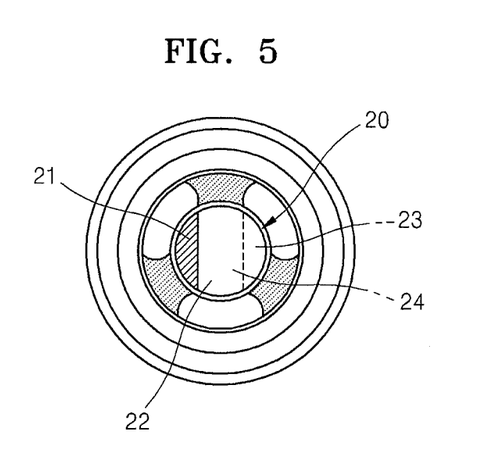
FIG. 5 is a top view of a secondary battery on which the circuit protection assembly illustrated in FIG. 4 is attached.

The circuit protection assembly 10 includes a positive temperature coefficient (PTC) element or a thermal fuse as a circuit protection element 13. The circuit protection assembly 10 may be attached on the secondary battery, and more particularly, on a top surface of the cap assembly 1, as illustrated in FIGS. 3 and 5. Alternatively, the circuit protection assembly 10 may be attached under the secondary battery, and more particularly, on a bottom surface of the cylindrical can 2, as illustrated in FIGS. 7, 8, 10, 11, 13, 15 and 16.

The circuit protection assembly 10 according to the current embodiment includes first metal foil 11, the circuit protection element 13, a supporting member 14 and second metal foil 12. The first metal foil 11 is attached on the bottom surface of the cylindrical can 2 or the top surface of the cap assembly 1. The circuit protection element 13 is disposed between the first metal foil 11 and the second metal foil 12. The circuit protection element 13 is formed of a material that has PTC characteristics and thus functions as a PTC element. The supporting member 14 is disposed between the first metal foil 11 and the second metal foil 12 and on a side of the circuit protection element 13.

The circuit protection element 13 may be a PTC element. The PTC element refers to a material obtained by mixing a polymer with a conductive material. A polymer-based conductive complex may be a mixture of a polymer, a conductive filler, an antioxidant and a peroxide crosslinking agent. The polymer may be a high-density polyethylene (HDPE), low-density polyethylene (LDPE), polyvinylidene fluoride (PVDF), polypropylene (PP) or ethylene/PP polymer having a melt index of 1 to 10. The conductive filler may be metal or metal oxide such as carbon black, carbon fiber or nickel. Although the polymer is generally an insulating material, the conductive filler allows conductive particles to be connected to each other at room or low temperature so as to provide a conductive path and thus the PTC element has excellent conductivity. If the temperature is increased above a certain level or an overcurrent flows, since the polymer in the PTC element expands, distances between the conductive particles are increased, and thus the conductive path is blocked, the conductivity of the PTC element is greatly reduced and thus PTC characteristics are manifested.

The first metal foil 11 and the second metal foil 12 are formed on both surfaces of the circuit protection element 13. The first metal foil 11 and the second metal foil 12 maintain the shape of the PTC element and function as terminals to be electrically connected to another element. The first metal foil 11 and the second metal foil 12 may be nickel foil, nickel-copper foil, or nickel and copper alloy foil.

An external lead plate L1 or L2 (See, for example FIG. 8) may be formed of conductive metal such as nickel or nickel-plated alloy. The first or second metal foil 11 or 12 of the circuit protection assembly may be attached to the external lead plate by using a welding or soldering method or a conductive adhesive. In particular, when the welding or soldering method is used, if the thickness of the external lead plate is small, the circuit protection element 13 may be damaged while welding or soldering is performed. However, if the thickness of the external lead plate is maintained above a certain level, the volume of the secondary battery is increased. Accordingly, a connection method capable of preventing the circuit protection element 13 from being damaged even when welding or soldering is performed is needed.

The circuit protection assembly 10 formed on the secondary battery will now be described in detail with reference to FIG. 2. The first metal foil 11 has a circular shape. The second metal foil 12 has a partially-cut circular shape corresponding to the shape of the first metal foil 11. The circuit protection element 13 has a partially-cut ring shape corresponding to the shape of the second metal foil 12. Hereinafter, 'correspondence' does not refer to identical correspondence in shape. For example, when the first metal foil 11 and the second metal foil 12 have the same shape except that the second metal foil 12 is partially cut, the shapes of the first metal foil 11 and the second metal foil 12 are regarded as corresponding to each other. Also, when the second metal foil 12 and the circuit protection element 13 have the same circumference despite having different shapes, the shapes of the second metal foil 12 and the circuit protection element 13 are regarded as corresponding to each other. The supporting member 14 has a partially-cut circular shape corresponding to an inner circumference of the circuit protection element 13.

FIG. 3 is a top view of a secondary battery on which the circuit protection assembly 10 illustrated in FIG. 2 is attached. Referring to FIG. 3, the first metal foil 11 is partially exposed and the second metal foil 12 is more exposed, because the circuit protection element 13 and the supporting member 14 are smaller than the first metal foil 11. If an external lead plate L1 or L2 formed on the secondary battery contacts the second metal foil 12, a current flows through the circuit protection element 13. On the other hand, if the external lead plate contacts the exposed portion of the first metal foil 11, the current flows without passing through the circuit protection element 13. Thus, as needed, one secondary battery may be used in both a product that requires the circuit protection assembly 10 and a product that doe not. In more detail, since one standardized secondary battery may have both high-output and high-capacity characteristics according to necessity, a high-output battery and a high-capacity battery may not be separately manufactured. Alternatively, the circuit protection element 13 may be added on or under a bare cell according to the type of product using the secondary battery. As such, a secondary battery not including the circuit protection element 13 is used in a product that requires a high output, e.g., an electric bicycle, an electric scooter or a power tool, and a secondary battery including the circuit protection element 13 may be used in a product that requires safety and a mild operation environment, e.g., a notebook computer. As such, different secondary batteries may not need to be manufactured for different products.

Figure 4:
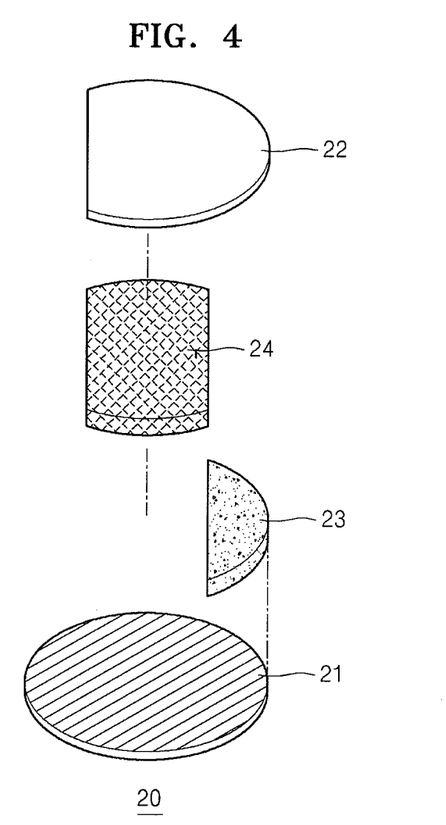
FIG. 4 is an exploded perspective view of a circuit protection assembly according to another embodiment of the present invention.

FIG. 4 is an exploded perspective view of a circuit protection assembly 20 to be attached on a secondary battery, according to another embodiment of the present invention.

Referring to FIG. 4, first metal foil 21 has a circular shape. Second metal foil 22 has a partially-cut circular shape corresponding to the shape of the first metal foil 21. A circuit protection element 23 has a partially-cut circular shape corresponding to the shape of the first or second metal foil 21 or 22 and is smaller than the second metal foil 22. A supporting member 24 has a two-side-cut circular shape corresponding to the shape of the second metal foil 22.

FIG. 5 is a top view of a secondary battery on which the circuit protection assembly 20 illustrated in FIG. 4 is attached.

Referring to FIG. 5, an exposed portion of the first metal foil 21 may have an area that is sufficient to be welded to an external lead plate L1 or L2. The shape of a combination of the circuit protection element 23 and the supporting member 24 corresponds to the shape of the second metal foil 22, but is not limited thereto. For example, the second metal foil 22 may have a shape for entirely covering the circuit protection element 23 and partially covering the supporting member 24, because the supporting member 24 is used to support the second metal foil 22 when the second metal foil 22 is welded to the external lead plate and thus may have an area that is sufficient to be welded.

Figure 6:
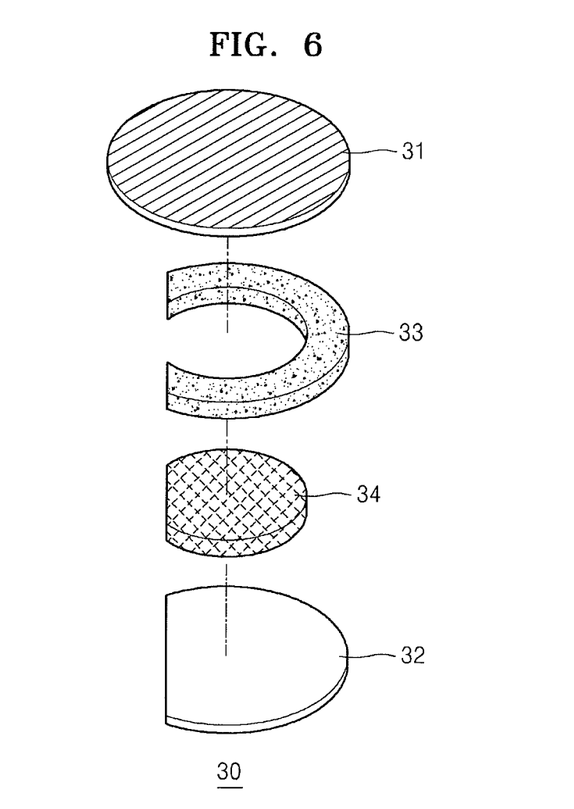
FIG. 6 is an exploded perspective view of a circuit protection assembly according to another embodiment of the present invention.

FIG. 6 is an exploded perspective view of a circuit protection assembly 30 to be attached under a secondary battery, according to another embodiment of the present invention.

Referring to FIG. 6, first metal foil 31 has a circular shape. Second metal foil 32 has a partially-cut circular shape corresponding to the shape of the first metal foil 31. A circuit protection element 33 has a partially-cut ring shape corresponding to the shape of the first or second metal foil 31 or 32. A supporting member 34 has a partially-cut circular shape corresponding to an inner circumference of the circuit protection element 33.

Figure 7:
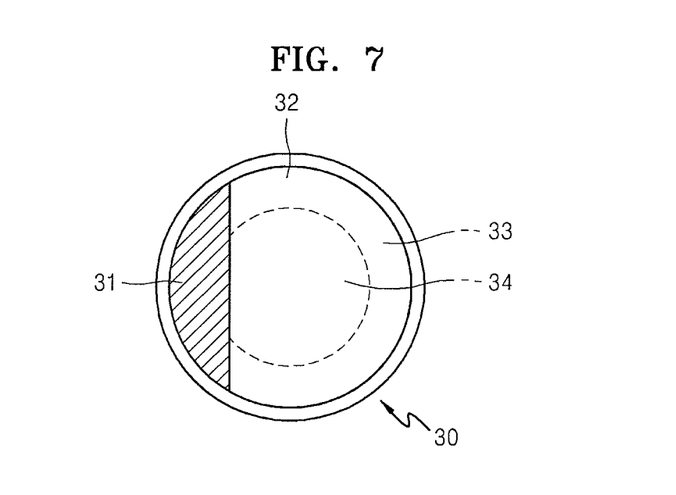
FIG. 7 is a bottom view of a secondary battery under which the circuit protection assembly illustrated in FIG. 6 is attached.
Figure 8:
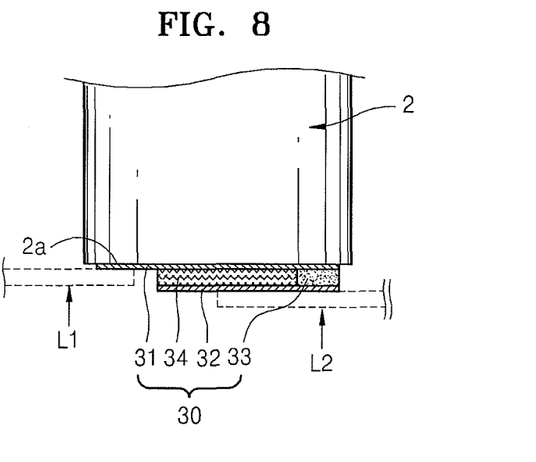
FIG. 8 is a side cross-sectional view of the secondary battery illustrated in FIG. 7.

FIG. 7 is a bottom view of a secondary battery under which the circuit protection assembly 30 illustrated in FIG. 6 is attached. FIG. 8 is a side cross-sectional view of the secondary battery illustrated in FIG. 7.

Referring to FIGS. 7 and 8, the first metal foil 31 is partially exposed and the second metal foil 32 is entirely exposed. If an external lead plate L1 or L2 formed under the secondary battery contacts the second metal foil 32, a current flows through the circuit protection element 33 (see L2). On the other hand, if the external lead plate contacts the exposed portion of the first metal foil 31, the current flows without passing through the circuit protection element 33 (see L1). Thus, according to necessity, one secondary battery may be used in both a product that requires the circuit protection assembly 30 and a product that does not.

Figure 9:
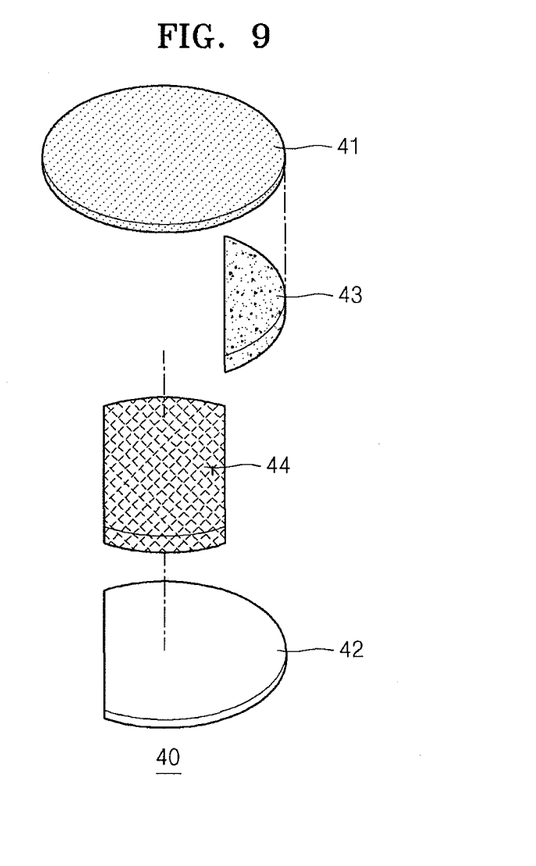
FIG. 9 is an exploded perspective view of a circuit protection assembly according to another embodiment of the present invention.

FIG. 9 is an exploded perspective view of a circuit protection assembly 40 to be attached under a secondary battery, according to another embodiment of the present invention.

Referring to FIG. 9, first metal foil 41 has a circular shape. Second metal foil 42 has a partially-cut circular shape corresponding to the shape of the first metal foil 41. A circuit protection element 43 has a partially-cut circular shape corresponding to the shape of the first or second metal foil 41 or 42 and is smaller than the second metal foil 42. A supporting member 44 has a two-side-cut circular shape corresponding to the shape of the second metal foil 42.

Figure 10:
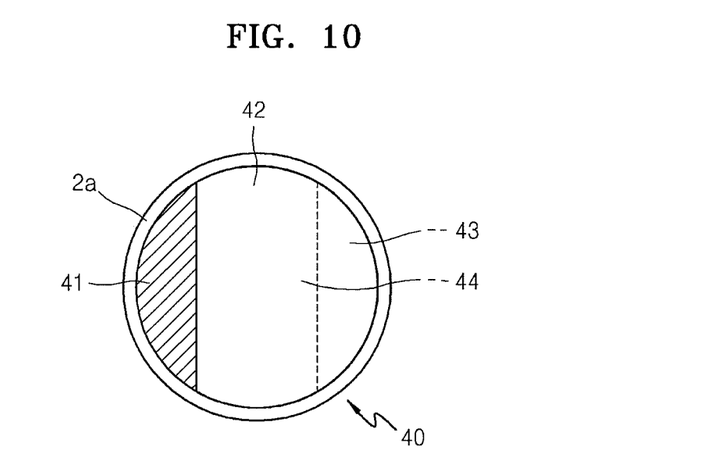
FIG. 10 is a bottom view of a secondary battery under which the circuit protection assembly illustrated in FIG. 9 is attached.
Figure 11:
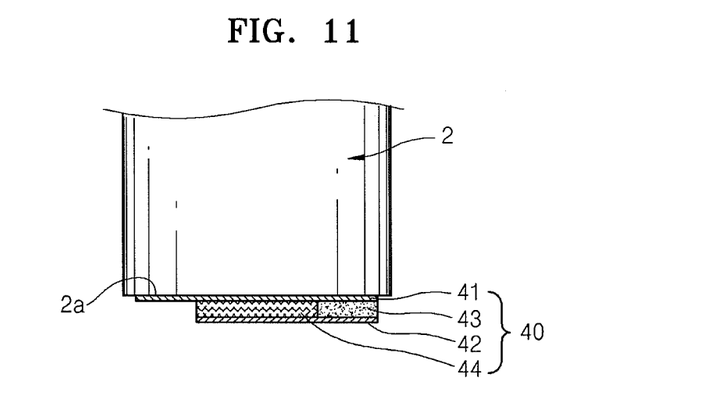
FIG. 11 is a side cross-sectional view of the secondary battery illustrated in FIG. 10.

FIG. 10 is a bottom view of a secondary battery under which the circuit protection assembly 40 illustrated in FIG. 9 is attached. FIG. 11 is a side cross-sectional view of the secondary battery illustrated in FIG. 10.

Referring to FIGS. 10 and 11, an exposed portion of the first metal foil 41 may have an area that is sufficient to be welded to an external lead plate L1 or L2. The shape of a combination of the circuit protection element 43 and the supporting member 44 corresponds to the shape of the second metal foil 42, but is not limited thereto. For example, the second metal foil 42 may have a shape for entirely covering the circuit protection element 43 and partially covering the supporting member 44, because the supporting member 44 is used to support the second metal foil 42 when the second metal foil 42 is welded to the external lead plate and thus may have an area that is sufficient to be welded.

Figure 12:
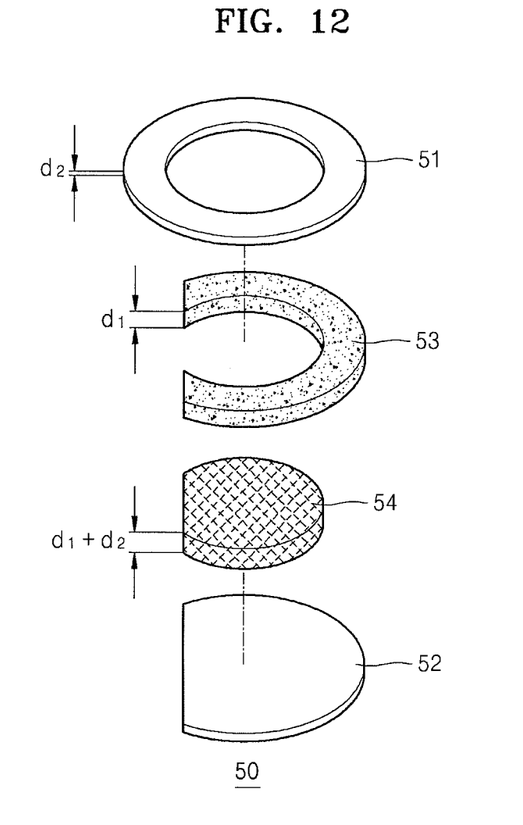
FIG. 12 is an exploded perspective view of a circuit protection assembly according to another embodiment of the present invention.

FIG. 12 is an exploded perspective view of a circuit protection assembly 50 to be attached under a secondary battery, according to another embodiment of the present invention.

Figure 13:
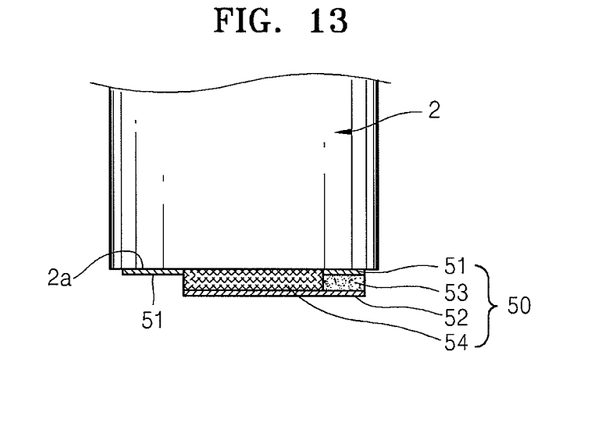
FIG. 13 is a side cross-sectional view of a secondary battery under which the circuit protection assembly illustrated in FIG. 12 is attached.

Referring to FIG. 12, the circuit protection assembly 50 is different from the circuit protection assembly 30 illustrated in FIG. 6 in that first metal foil 51 has a ring shape instead of a circular shape and that the thickness of a supporting member 54 (d1+d2) equals the sum of the thickness of the first metal foil 51 (d2) and the thickness of a circuit protection element 53 (d1). Accordingly, as illustrated in FIG. 13, one surface of the supporting member 54 directly contacts a bottom surface 2a of a cylindrical can 2.

Figure 14:
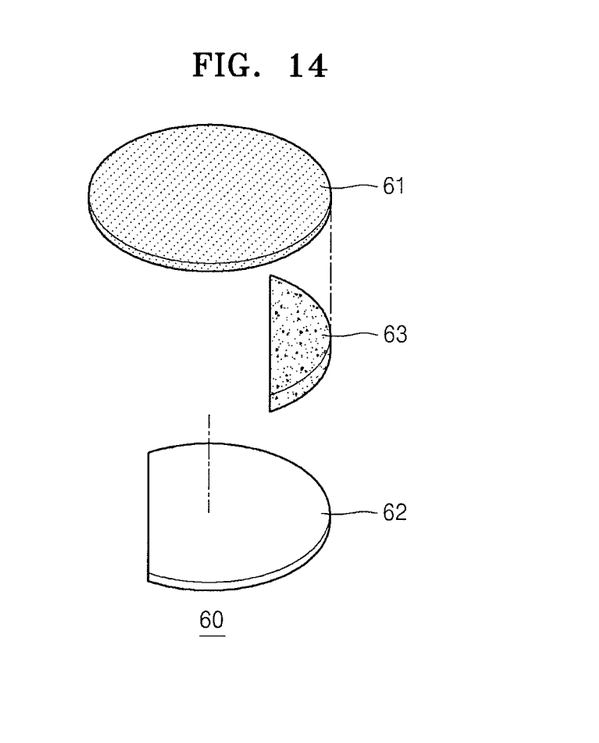
FIG. 14 is an exploded perspective view of a circuit protection assembly according to another embodiment of the present invention.

FIG. 14 is an exploded perspective view of a circuit protection assembly 60 according to another embodiment of the present invention.

Figure 15:
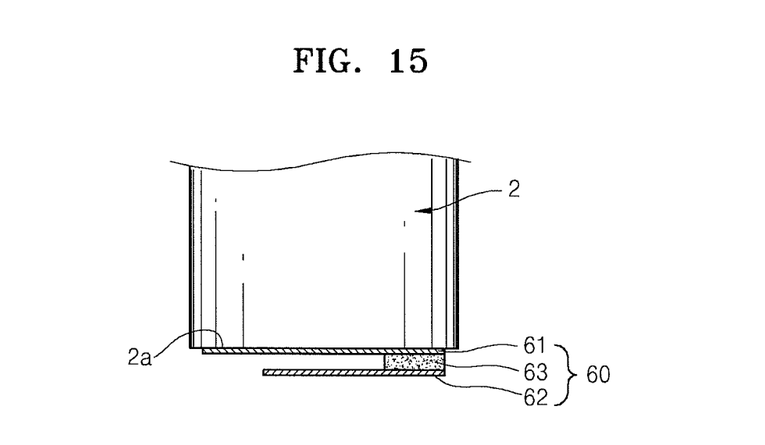
FIG. 15 is a side cross-sectional view of a secondary battery under which the circuit protection assembly illustrated in FIG. 14 is attached.

Referring to FIG. 14, first metal foil 61 has a circular shape. Second metal foil 62 has a partially-cut circular shape corresponding to the shape of the first metal foil 61. A circuit protection element 63 has a partially-cut circular shape corresponding to the shape of the first or second metal foil 61 or 62 and is smaller than the second metal foil 62. The circuit protection assembly 60 is different from the previous embodiments in that a supporting member is not included. Accordingly, as illustrated in FIG. 15, an empty space exists between the first metal foil 61 and the second metal foil 62. A portion of the second metal foil 62 corresponding to the empty space is combined with an external lead plate L1 or L2 by using, for example, a welding method. In this case, a welding jig 90 illustrated in FIG. 17E may be used to support the second metal foil 62.

Although the circuit protection element assemblies 50 and 60 are mounded under a secondary battery in FIGS. 12 through 15, the position of the circuit protection element assemblies 50 and 60 is not limited thereto and the circuit protection element assemblies 50 and 60 may be attached on a secondary battery, and more particularly, on a top surface of the cap assembly 1 illustrated in FIG. 1.

Figure 16:
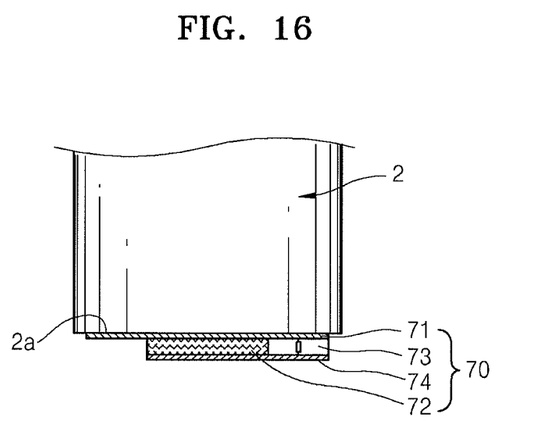
FIG. 16 is a side cross-sectional view of a secondary battery under which a circuit protection assembly is attached, according to another embodiment of the present invention.

FIG. 16 is a side cross-sectional view of a secondary battery under which a circuit protection assembly 70 is attached, according to another embodiment of the present invention.

Referring to FIG. 16, the circuit protection assembly 70 is different from the previous embodiments in that a circuit protection element 73 is a thermal fuse. A PTC element interrupts a circuit as the resistance of the PTC element is greatly increased in a predetermined condition, for example, at a temperature higher than a certain level. However, if the temperature is lowered below the certain level, the resistance is reduced and thus the PTC element returns to an original state and thus is reusable. On the other hand, a thermal fuse interrupts a circuit as a conductive wire of the thermal fuse is cut at a temperature higher than a certain level and thus is not reusable. That is, like the PTC element, the thermal fuse 73 interrupts a circuit when the temperature of a secondary battery is greatly increased in an abnormal environment or under abnormal conditions. However, when this occurs, the circuit protection assembly 70 needs to be changed in order to protect against damage and performance deterioration.

FIGS. 17A through 17D are side cross-sectional views for describing a method of manufacturing the secondary battery illustrated in FIG. 11, according to an embodiment of the present invention.

Figure 17A:
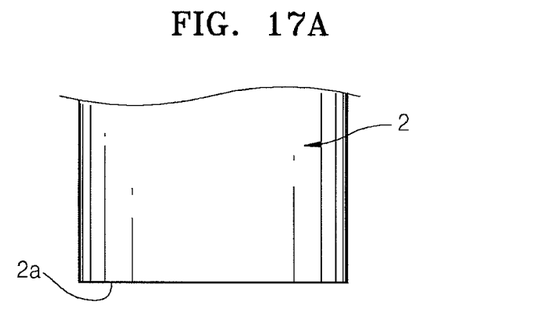
FIGS. 17A through 17D are side cross-sectional views for describing a method of manufacturing the secondary battery illustrated in FIG. 11, according to an embodiment of the present invention.

Initially, a cylindrical can 2 is prepared (FIG. 17A). In this case, the cylindrical can 2 may accommodate an electrode assembly and an electrolyte, and may be sealed by using a cap assembly. Alternatively, the cylindrical can 2 may not accommodate anything.

Figure 17B:
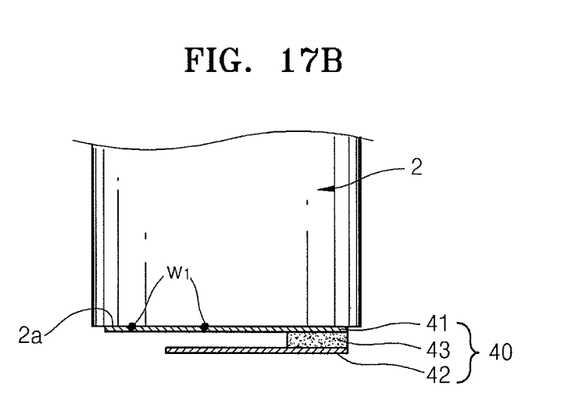

A circuit protection assembly 40 is attached on a bottom surface of the cylindrical can 2 (FIG. 17B). An attaching method may be a welding method, and more particularly, a resistance welding method, or a soldering method or a method using a conductive adhesive. If the resistance welding method is used, the cylindrical can 2 is welded to a portion of first metal foil 41, on which a circuit protection element 43 is not attached, and is also welded to a portion of the first metal foil 41, which does not correspond to second metal foil 42, because the cylindrical can 2 is generally attached to the first metal foil 41 after the circuit protection assembly 40 is formed. The number of welding points $W_1$ can be one and may be equal to or greater than two.

Figure 17C:
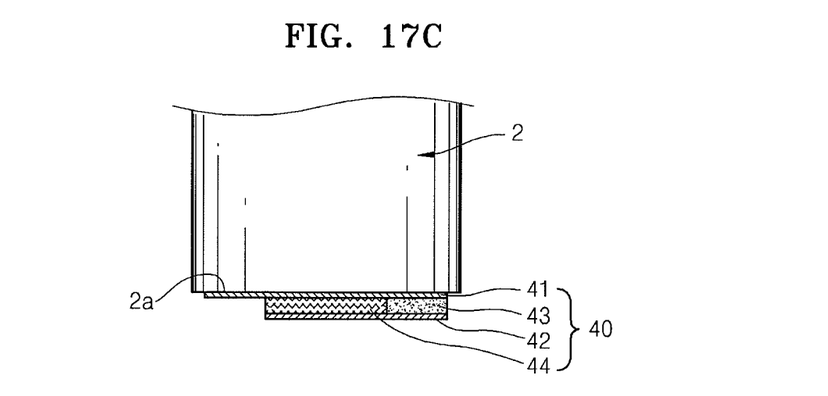

A supporting member 44 is disposed between the first metal foil 41 and the second metal foil 42 (FIG. 17C). The supporting member 44 may be disposed and then fixed. For this, the supporting member 44 may be inserted and then fixed by using, for example, a non-conductive adhesive. The supporting member 44 may contact a side surface of the circuit protection element 43 or may be separate from the circuit protection element 43. The supporting member 44 is used to support the second metal foil 42 when the second metal foil 42 is welded to an external lead plate 100 illustrated in FIG. 17D and thus is not always required to contact the side surface the circuit protection element 43. The supporting member 44 is an insulator. If the supporting member 44 is a conductor, when a current flows between the first metal foil 41 and the second metal foil 42, the supporting member 44 may allow the current to flow through only the supporting member 44 without passing through the circuit protection element 43 and thus the circuit protection element 43 may not function as a PTC element.

Figure 17D:
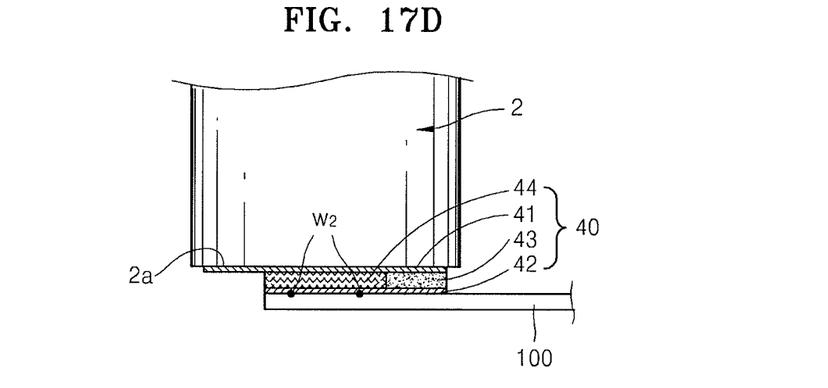

Then, the external lead plate 100 is welded to the second metal foil 42 (FIG. 17D). The number of welding points W2 may be equal to or greater than two, but is not limited thereto. The second metal foil 42 is pressed when resistance welding is performed, which ensures the welding to be firmly performed without deformation of the second metal foil 42 as the supporting member 44 supports the second metal foil 42. As such, damage to the circuit protection element 43 may be prevented by welding the external lead plate 100 to a portion of the second metal foil 42 corresponding to the supporting member 14 instead of to a portion of the second metal foil 42 corresponding to the circuit protection element 43. As the external lead plate 100 contacts the second metal foil 42, a discharge circuit of the secondary battery includes the circuit protection element 43 and thus the secondary battery is appropriate for an electronic device that requires safety and high-capacity characteristics.

Although the circuit protection assembly 40 is directly connected to the external lead plate 10 in FIG. 17D, the circuit protection assembly 40 may further include an additional conductive plate such as a nickel strip on the second metal foil 42.

As described above in relation to FIG. 3, if the external lead plate 100 contacts the first metal foil 41, the discharge circuit of the secondary battery does not include the circuit protection element 43 and thus the secondary battery is appropriate for an electronic device that requires high-output characteristics.

Figure 17E:
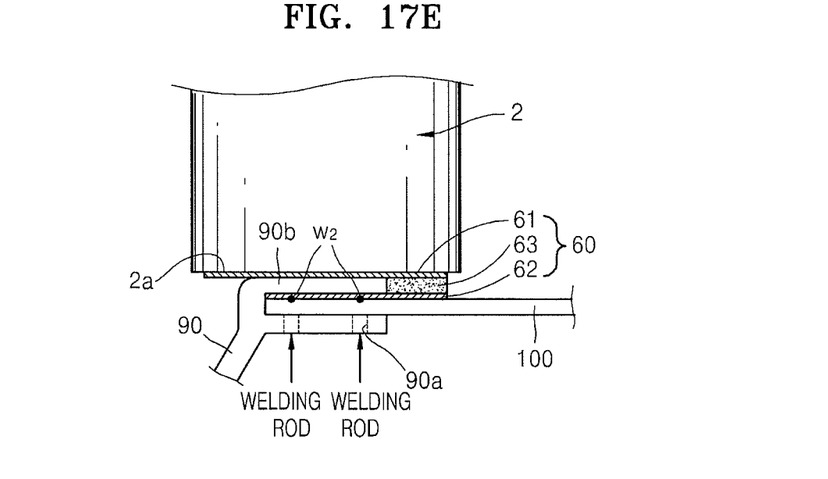
FIG. 17E is a side cross-sectional view for describing a method of manufacturing the secondary battery illustrated in FIG. 15, according to an embodiment of the present invention.

FIG. 17E is a side cross-sectional view for describing a method of manufacturing the secondary battery illustrated in FIG. 15, according to an embodiment of the present invention.

Operations performed in FIGS. 17A and 17B are also performed and then an arm 90*b* of a welding jig 90 is inserted between first metal foil 61 and second metal foil 62. Then, welding rods (not shown) are inserted into holes 90*a* formed in the welding jig 90 and an external lead plate is welded to the second metal foil 62. The length and thickness of the arm 90*b* of the welding jig 90 and the size of the holes 90*a* of the welding jig 90 are designed to be appropriate for a rapid welding operation.

A secondary battery according to one or more of the above embodiments of the present invention may also be applied to an oval secondary battery or a rectangular secondary battery as well as a cylindrical secondary battery. That is, the shape of the secondary battery does not matter. The secondary battery may be applied to all batteries having a capacity equal to or greater than about 2,000 mAh or batteries having an output equal to or greater than about 7 C. Here, a battery having an output of 7 C refers to a battery capable of outputting a current of 14,000 mA that is seven times of a capacity of, for example, 2,000 mAh. Although a rectangular battery having a high output equal to or greater than 7 C does not currently exist, if such a rectangular battery is developed, the rectangular battery is also included in the scope of the present invention. Also, the shapes of the first metal foil 11, 21, 31, 41, 51, 61 or 71 and the second metal foil 12, 22, 32, 42, 52, 62 or 72 illustrated in FIG. 2, 4, 6, 9, 12, 14 or 16 may be appropriately changed according to the shape of the secondary battery. Furthermore, 2000 mAh and 7 C used as reference values to describe a high output and a high capacity may also be easily changed by one of ordinary skill in the art.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A secondary battery comprising:
    a can for accommodating an electrode assembly and an electrolyte;
    a cap assembly mounted on the can;
    first metal foil having an outer edge and a first and a second surface attached on a top surface of the cap assembly or a bottom surface of the can via the second surface;
    a circuit protection element attached on the first metal foil so as to overlie the first surface of the first metal foil; and
    second metal foil having a first and a second surface attached on the circuit protection element via the second surface,
    wherein the second metal foil and the circuit protection element are configured such that at least a portion of the first surface and the outer edge of the first metal foil is exposed wherein the exposed portion of the perimeter of the first surface of the first metal foil is sized to permit a lead to be attached to the exposed surface of the first metal foil adjacent the outer perimeter of the first surface of the first metal foil, wherein the second metal foil extends toward a center of the can from an end of the circuit protection element, and
    wherein a supporting member is disposed between the first surface of the first metal foil and the second surface of the second metal foil and wherein the first surface of the second metal foil is positioned on the circuit protection element so that the first surface of the second metal foil is not covered by the circuit protection element or the supporting member, and wherein the first surface of the first metal foil defines a first cross-sectional area, and the second metal foil is positioned on the supporting member so as to be positioned within a plane defined by the first cross-sectional area.

2. The secondary battery of claim 1, wherein the secondary battery has a cylindrical shape.

3. The secondary battery of claim 2, wherein the can is a cylindrical can.

4. The secondary battery of claim 1, wherein the circuit protection element is a positive temperature coefficient (PTC) element.

5. The secondary battery of claim 1, wherein the circuit protection element is a thermal fuse.

6. The secondary battery of claim 1, further comprising a supporting member disposed on a side of the circuit protection element, the supporting member being in surface-contact with at least a portion of the second surface of the second metal foil.

7. The secondary battery of claim 6, wherein the supporting member is an electrical insulator.

8. The secondary battery of claim 6, wherein the circuit protection element, the supporting member and the second metal foil are configured such that at least a portion of the first surface of the first metal foil is exposed.

9. The secondary battery of claim 6, wherein the first metal foil has a circular shape,
wherein the circuit protection element is a PTC element and has at least a partial ring shape,
wherein the supporting member has a shape corresponding to at least a portion of a hole formed in the at least partial ring shape of the circuit protection element, and
wherein the second metal foil has a shape for covering the circuit protection element and the supporting member.

10. The secondary battery of claim 6, wherein the first metal foil has a ring shape,
wherein the circuit protection element has a partially-cut ring shape corresponding to the ring shape of the first metal foil,
wherein the supporting member has a shape corresponding to at least a portion of a hole formed in the partially-cut ring shape of the circuit protection element, and
wherein the second metal foil has a partially-cut circular shape corresponding to the circuit protection element and the supporting member.

11. The secondary battery of claim 6, wherein the first metal foil has a circular shape,
wherein the circuit protection element has a partially-cut circular shape corresponding to the circular shape of the first metal foil,
wherein the supporting member has a two-side-cut circular shape, and
wherein the second metal foil has a shape corresponding to a combination of the first metal foil and the supporting member.

12. The secondary battery of claim 6, wherein the second metal foil is welded to an external tab for electrical connection, and
wherein a portion of the second metal foil corresponding to the supporting member is welded to the external tab.

13. The secondary battery of claim 1, wherein the secondary battery has a capacity equal to or greater than 2,000 mAh or an output equal to or greater than 14,000 mA.

14. A method of manufacturing a secondary battery, the method comprising:

preparing a can for accommodating an electrode assembly and an electrolyte, and a cap assembly mounted on the can;
attaching a circuit protection assembly formed by stacking first metal foil, a circuit protection element and second metal foil, on a bottom surface of the can or a top surface of the cap assembly wherein the circuit protection element and the second metal foil are contoured so that an outward surface and an outer edge of a first surface of the first metal foil is exposed so that the exposed portion of the outer perimeter of the first metal foil is sized to receive a lead that is attached to the outer perimeter of the surface of the first metal foil; and
attaching an external tab to an extended portion of the second metal foil, the extended portion not corresponding to the circuit protection element, for electrical connection wherein the second metal foil extends toward a center of the can from an end of the circuit protection element, and
wherein a supporting member is disposed between the first metal foil and the second metal foil and wherein a second surface of the second metal foil is positioned on the circuit protection element so that a first surface of the second metal foil is not covered by the circuit protection element or the supporting member and wherein the first surface of the first metal foil defines a first cross-sectional area, and the second metal foil is positioned on the supporting member so as to be positioned within a plane defined by the first cross-sectional area.

15. The method of claim 14, wherein the circuit protection assembly further comprises a supporting member disposed on a side of the circuit protection element, the supporting member being in surface-contact with the second surface of the second metal foil, and
wherein the extended portion of the second metal foil overlaps the supporting member.

16. The method of claim 14, further comprising disposing a welding jig on a side of the circuit protection element so as to be in surface-contact with the first metal foil,
wherein the attaching of the external tab comprises welding the external tab to a portion of the second metal foil corresponding to the supporting member.

17. The method of claim 16, wherein the supporting member and the welding jig are electrical insulators.

18. The method of claim 14, wherein the attaching of the circuit protection assembly comprises welding a portion of the first metal foil not corresponding to the circuit protection element on the bottom surface of the can or the top surface of the cap assembly.

19. The method of claim 14, wherein the circuit protection element is a positive temperature coefficient (PTC) element.

20. The method of claim 14, wherein the circuit protection element is a thermal fuse.

* * * * *